Patented Oct. 20, 1942

2,299,306

UNITED STATES PATENT OFFICE 2,299,306

PARAFFIN WAX COMPOSITION AND METHOD OF PRODUCING SAME

Mead Cornell, Cleveland, Ohio, assignor to The Cornell Machine Company, Cleveland, Ohio, a corporation of Ohio No Drawing. Application August 12, 1938,
Serial No. 224,492

11 Claims. (Cl. 106—271)

This invention relates, as indicated, to a paraffin wax composition and the method of producing same and more particularly, to a paraffin wax composition characterized by improved plastic flow and/or a melting point higher than that of ordinary paraffin wax.

Paraffin wax, as the same is commercially available, has a melting point of from about 115° F. to about 135° F. and is further characterized by the fact that it has a relatively poor plastic flow; that is, the wax is rather short in texture so that any attempt to deform the same to an appreciable extent, results in a crumbling or breaking of the wax structure.

By the term "paraffin wax," as used herein, is meant the wax which is ordinarily available from petroleum sources and is commonly called "scale wax" and is characterized by being relatively low in cost and having a relatively low melting point. It is to the improvement of the properties of this type of low-cost wax, making the same available for use for purposes which heretofore could only be satisfied by the higher priced and higher melting point waxes, that this invention is particularly directed.

Among the uses to which wax of this type is placed is the coating of paper stock and the like and it is one of the desirable characteristics of such a wax that when a plurality of layers of the wax-coated paper are brought into intimate contact, the wax from one sheet will not adhere to the other sheet and upon separation of the paper, tear loose and leave an uncoated area of paper exposed. This property of sticking is generally referred to as blocking.

I am aware of the efforts of certain prior art workers in an endeavor to achieve certain of the more limited objects of my invention; however, due to the particular process which I may employ for the production of the improved composition comprising my invention, a material not only superior to that previously available may be produced but in addition, such improved material may be produced at a lower cost.

Other objects of my invention will appear as the description proceeds.

To the accomplishment of the foregoing and related ends, said invention, then consists of the means hereinafter fully described and particularly pointed out in the claims. The following description sets forth in detail one method and one product exemplifying my invention, such disclosed procedure and product constituting, however, but one of the various applications of the principle of my invention.

Broadly stated, this invention comprises the provision of a paraffinic wax composition in which the properties of the paraffinic wax have been modified by the addition thereto of separate substances which respectively improve its plastic flow and raise its melt point.

By the term "paraffinic wax composition," as used herein, I mean a wax, predominantly paraffin wax, of the type previously identified as "scale wax" and it is to be noted that my invention is applicable to the modification of such paraffinic wax, even though the same may contain additional substances or impurities.

As indicated, the paraffinic wax which is used as the starting material and whose properties it is desired to improve, is modified in two ways: first, by improving its plastic flow; and second, by raising its melting point.

IMPROVEMENT OF THE PLASTIC FLOW

The plastic flow of the paraffinic wax is improved by incorporating therewith minor amounts on the order of about 0.1% to about 10% of a resin preferably of petroleum origin.

Among the resins which I have found suitable for this purpose are those found in the residue removed from petroleum oil by conventionally employed solvents used in well-known solvent extraction processes.

A particular resin which I have found very suitable for this purpose is a resin derived from the extract or residue of Mid-Continent oil, which has been furfural extracted, i. e., the resin which is derived from the furfural extract of petroleum oil of Mid-Continent origin.

The extracts removed with other solvents, that is in addition to furfural, for example, Sulphur dioxide
Di-chlor di-ethyl ether
Propane
Iso-amyl alcohol
Phenol
Cresol may likewise be employed.

The resin which is thus employed as the modifying agent for the paraffinic wax may be removed from the above identified solvent extraction residues, either by further solvent extraction, preferably by means of a solvent other than that used in obtaining the extract, or by fractional distillation.

An example of a type of resin useful for our purpose which has been obtained by solvent extraction is described in U. S. Patent No. 2,114,796, This product may be further improved by fractional distillation.

A preferred product is that removed from such residues by the distillation process and particularly that fraction of the distillate constituting what is collected after about 50 to 60% of the material has distilled over and while 1 to 5% remains undistilled.

These resins are ordinarily so highly viscous at room temperature as to be substantially non-fluid, and since the wax with which they are to be blended for the purpose of improving the latter is usually a solid at room temperature, both the resin and the wax are heated sufficiently to liquefy the same so that they may be readily mixed. Care should be exercised in heating the material prior to mixing so as to prevent overheating, since it has been found that heating of the mixture to a temperature higher than 300° F. may result in the deterioration of the end product.

The mixing of the liquefied constituents may be accomplished mechanically in any suitable mixing apparatus; however, I have found that improved results are secured when the mixture of liquefied resin and wax is homogenized by apparatus such as illustrated in my prior Patent No. 2,042,880. When the modifying step is carried on as a continuous process, it is within the contemplation of my invention to proportion the wax and resin as they enter the homogenizer or mixing device by apparatus such as is illustrated, for example, in my prior Patent No. 2,109,331.

When the mixing of the wax and the modifying agent is carried out by the use of the above described homogenizer, it has been found that a smaller proportion of the modifying agent may be employed for the purpose of producing a given result than when the materials are merely mechanically agitated, for example, in a heated kettle.

RAISING THE MELTING POINT OF THE COMPOSITION

The melting point of the paraffinic wax may be raised by the addition thereto of minor amounts of an aromatic amide of a fatty acid or by means of a soap, or by both. I am aware of the use of certain of these materials by prior workers in the art; (see, for example, Patent Nos. 741,584 and 1,659,150) however, my process and the product resulting therefrom are distinguishable from these prior art processes and the products produced thereby in that such prior art processes generally employ a larger percentage of the modifying agent than is necessary in accordance with my process; nor have such prior art processes employed the further modifying material which has been above described as the material improving the plastic flow of the composition.

The process and product comprising my invention are an improvement over the prior art by virtue of the combined properties of the increased melting point and improved plastic flow which my product possesses.

A wax of the character to which this invention relates may have its melting point raised to a desirable predetermined minimum temperature; however, the plastic flow properties thereof may be such as to make the high melting point material unsuitable for uses such as coating materials on paper stock.

Not only are the plastic flow properties of the modified wax comprising my invention better than the plastic flow of the hardened wax to which no petroleum resin has been added, for example, but in addition, the plastic flow of the end product characterizing my invention is better than the starting material which, as indicated, had a considerably lower melting point.

While I am not fully familiar with the exact theory of operation of the modifying constituents which I thus employ in combination, it nevertheless appears from an inspection of the characteristics of the end product containing both these constituents that there is a cooperative effect between the two constituents so far as melting point increase is concerned.

Among the specific aromatic amides of fatty acids which may be employed as modifying substances, the following may be named:

Stearanilide and homologs of stearanilide, for example, the aromatic amides formed by the reaction of stearic acid and any of the following aromatic bases:

Toluidine
Xylidine
Methyl aniline
Ethyl aniline or similar aromatic amides formed by the reaction of aromatic bases with other fatty acids, such as:

Lauric
Myristic
Palmitic
Margaric
Carnaubic
Melissic
Oleic
Linoleic
Ricinoleic
Stearolic The modifying agents may be added to the wax, either separately, or at the same time. The remarks made above with respect to the use of homogenizing and proportioning devices apply equally with respect to the modifying agent which is employed for the purpose of raising the melting point.

Similarly to the improved results secured by the use of an homogenizer in incorporating small amounts of the material for improving the plastic flow, likewise the use of an homogenizer for incorporating the material for raising the melting point effects further and unexpected improvements. This is illustrated by the fact that smaller amounts of the material may be employed to produce a given result when a homogenizer is employed than when the mixture is merely effected by conventional mechanical mixing apparatus. When mixing is accomplished by means of an homogenizer, the blending may be accomplished at much lower temperatures than when merely simple mixing devices are employed. This results in an improved product because deterioration, such as that resulting from oxidation, discoloration, etc., when the wax is exposed to high temperatures, is prevented.

The materials above mentioned which may be employed for the purpose of raising the melting point of the wax may usually be employed in percentages of from about 0.1% to about 10%, the amount used, of course, depending upon the degree to which the melting point is to be raised.

The following are specific examples of various modified paraffinic wax compositions representative of my invention:

Example I

| | Parts by weight |
|---|---|
| Paraffin wax (125° F.–127° M. P.) | 95 |
| Stearanilide | 2.5 |
| Petroleum resin | 2.5 |

The melting point[1] of the end product was 155°–165° F.

Example II

| | |
|---|---|
| Paraffin wax (125° F.–127° M. P.) | 92.5 |
| Stearanilide | 5.0 |
| Petroleum resin | 2.5 |

The melting point[1] of the end product was 170°–180° F.

Example III

| | |
|---|---|
| Paraffin wax (125° F.–127° M. P.) | 90 |
| Stearanilide | 7 |
| Petroleum resin | 3 |

The melting point[1] of the end product was 190°–200° F.

[1] These melting point determinations were made by following the procedure of the "General Electric method" for determining "melting point of bituminous materials" (Handbook of Petroleum, Asphalt and Natural Gas by Roy Cross, Bulletin No. 25) excepting that the composition for which the melting point was to be determined, instead of being molded onto the bulb of the thermometer as is conventional in this type of test, was applied thereto in the following manner:—The thermometer was chilled to 40° F., immersed in a sample of the wax composition which had been heated to a liquid state and then the thermometer immediately withdrawn so that a uniform film of solidified wax adhered to the thermometer bulb.

The modified paraffinic wax composition comprising my invention has a wide variety of uses. It will be found particularly useful as a coating for paper and similar materials such as chipboard, and due to its non-toxic character, wrapping materials coated with such wax may be used in food packages. The material may be used as a constituent in lubricants where wax compositions of this charatcer are ordinarily employed. Candles may also be formed of this improved wax composition and the same is, of course, adapted to many other uses which are to numerous to mention.

The modified paraffinic wax composition comprising my invention will be found particularly useful as the wax which is sprayed in very finely divided form onto signatures and the like as they are delivered from the printing press and where it is desired to provide a slightly roughened surface on the printed paper as it is stacked, to prevent smearing of the ink and facilitate the evaporation of the solvents used in the ink.

The modified paraffin wax is particularly suitable for application in the form of a water emulsion. In the preparation of such emulsion, a deflocculating agent, such as:

Tri-ethanolamine-stearate
  Di-ethylene-glycol-stearate may be incorporated in the composition, either by simply mixing or preferably by homogenizing; (this may be done at the time the composition containing the other modifying agents is originally prepared or as a separate operation), or the deflocculating agent may be incorporated in the emulsion at the time that the emulsion is formed. In the former case, the wax composition containing the deflocculating agent is very readily emulsified with water and this operation may advantageously be carried out at the location at which the emulsion is to be used. In such case, a device of the kind described in my Patent No. 2,042,880 is particularly useful.

Thus, instead of shipping a prepared emulsion from the point of manufacture of the wax, to its point of application to paper; for example, the modified wax composition containing the deflocculant is merely shipped and the emulsion prepared at the point of use and as required.

While the two previously specifically identified deflocculating agents, or more accurately, emulsifying agents, have been indicated as preferable, nevertheless, any alkali salts of fatty acids, such as stearic, oleic and palmitic, etc. such as are commonly used as emulsifying agents, may be employed.

Instead of incorporating the emulsifying agent in the wax and then mixing the wax with water in the manner above described, it will be preferable in many cases to include the fatty acid in the wax and then include the organic base in the water from which the emulsion is prepared.

The various fatty acids which may thus be included in the wax are any of the fatty acids previously mentioned which may be used in connection with the preparation of the aromatic amides.

Among the organic bases which may be included in the water from which the emulsion is made so that when they combine with the acid they form the emulsifying agent may be mentioned ammonia, tri-ethanol amine and morpholine.

This procedure of incorporating the acid with the wax and the organic base in the water to provide the constituents for the production of the emulsifying agent when the wax and water are mixed, is highly desirable since the evaporation of the water will carry with it the organic base, leaving only the fatty acid in the wax which occurs as a layer on the paper stock, for example, which is coated by the wax. The occurrence of the fatty acid in the wax is much less objectionable than the occurrence of an emulsifying agent which would be the case if the emulsifying agent were itself added to the wax.

Throughout the claims in this case, the material which is added to the paraffinic wax for the purpose of improving its plastic flow properties, is generically identified as a "resin" and in the foregoing description, the resins which have been indicated as being particularly suitable are of petroleum origin. The reason for selecting the resins of this particular source is because they are completely miscible with wax which is also of petroleum source.

It will be observed that other resins of similar characteristics and which are oil soluble, at least to a certain extent, may also be employed, such as, for example, rosin, and when the term "resin" is used in a generic sense in the appended claims, it is intended to include such additional materials.

Likewise, in the claims, the material which has been added to the paraffinic wax for the purpose of raising its melting point is generically identified as a "hardener." By this term, as thus used in the claims, is meant the specifically named materials, whose property has been identified as that of raising the melting point of the wax, and such term is meant to include the materials generically identified as aromatic amides and soaps.

In the description of the specific examples, it will be noted that the particular procedure has been identified as that followed in determining the melting point of the end product.

Where the term "melting point" is used in the appended claims, it is to be understood that the melting point is to be determined according to the manner of the test procedure of the type described in connection with the identification of the specific examples.

Other modes of applying the principle of my invention may be employed instead of the one explained, change being made as regards the product and method herein disclosed, provided the step or steps stated by any of the following claims or the equivalent of such stated step or steps be employed.

I, therefore, particularly point out and distinctly claim as my invention:

1. As a new article of manufacture, a paper stock coated with a non-blocking paraffin wax of high melting point containing minor amounts of both a resin of petroleum origin and an aromatic amide of a fatty acid.

2. The method of improving the properties of paraffin wax affecting its use as a coating material for paper and the like which comprises homogenizing with such wax from about .1% to about 10% of a petroleum resin and from about .1% to about 10% of an aromatic amide of a fatty acid.

3. As a composition of matter, a plastic paraffin wax of high melting point containing minor amounts of both an aromatic amide of a fatty acid and a resin derived from the solvent extraction of petroleum oil.

4. An improved non-blocking paraffin wax of increased plasticity and high melting point comprising a major amount of paraffin wax homogenized with minor amounts of both an aromatic amide of a fatty acid and a resin derived from the solvent extraction of petroleum oil.

5. A water emulsion of paraffin wax homogenized with minor amounts of both an aromatic amide of a fatty acid and a resin of petroleum origin.

6. The method of preparing a water emulsion of paraffin wax which comprises mixing an aqueous solution of an organic base with a paraffin wax in which has been incorporated minor amounts of an aromatic amide of a fatty acid, a resin of petroleum origin and a fatty acid.

7. As a composition of matter, a paraffin wax in which has been incorporated minor amounts of each: an aromatic amide of a fatty acid, a resin of petroleum origin and a fatty acid.

8. A composition of matter comprising a major proportion of paraffin wax and minor proportions, based on the amount of paraffin wax, of each of: an aromatic amide of a fatty acid, a resin of petroleum origin and an alkali salt of a fatty acid.

9. A composition of matter comprising a major proportion of paraffin wax, a minor amount of a resin of the type which when used alone increases the plastic flow of the wax, and a minor amount of an aromatic amide of a fatty acid.

10. A composition of matter comprising a major proportion of paraffin wax, a minor proportion of a resin of the type which when used alone increases the plastic flow of the wax and a minor amount of a substance selected from the class consisting of stearanilide and homologs of stearanilide.

11. A composition of matter comprising a major proportion of paraffin wax, a minor proportion of stearanilide and a minor proportion of a resin derived from the furfural extractions of petroleum oil.

MEAD CORNELL.